March 7, 1950 L. VON CSEH 2,499,432
STAPLING MACHINE
Filed Aug. 27, 1945 4 Sheets-Sheet 2
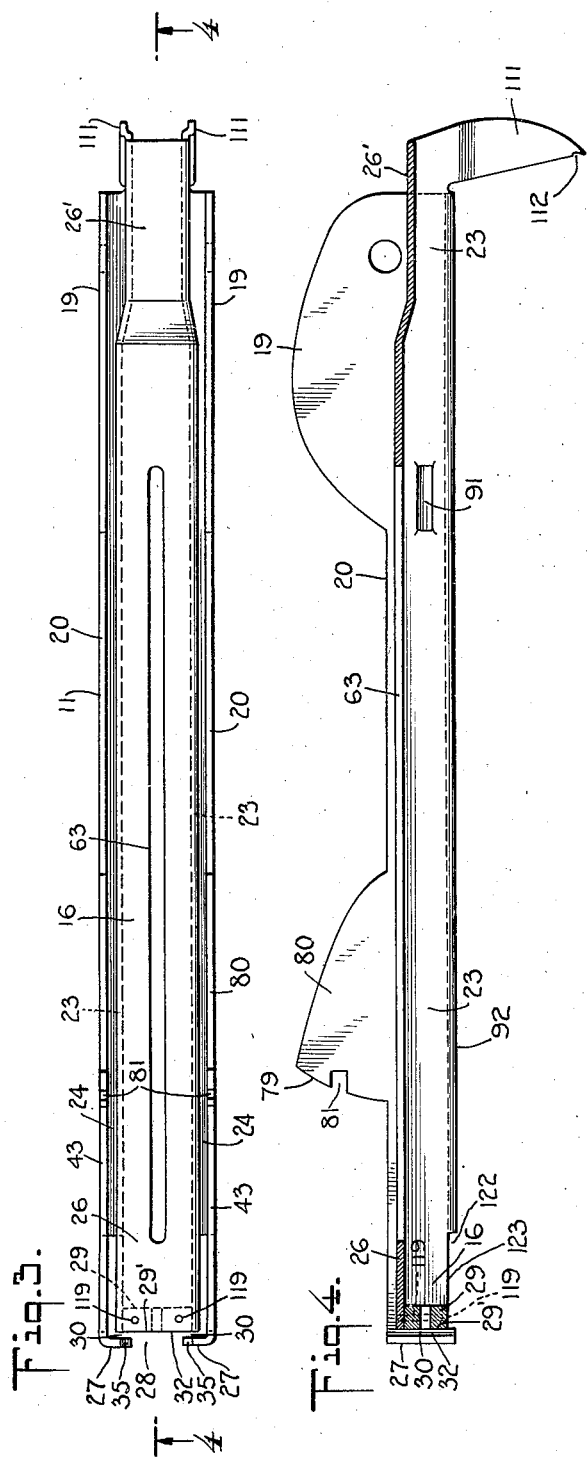
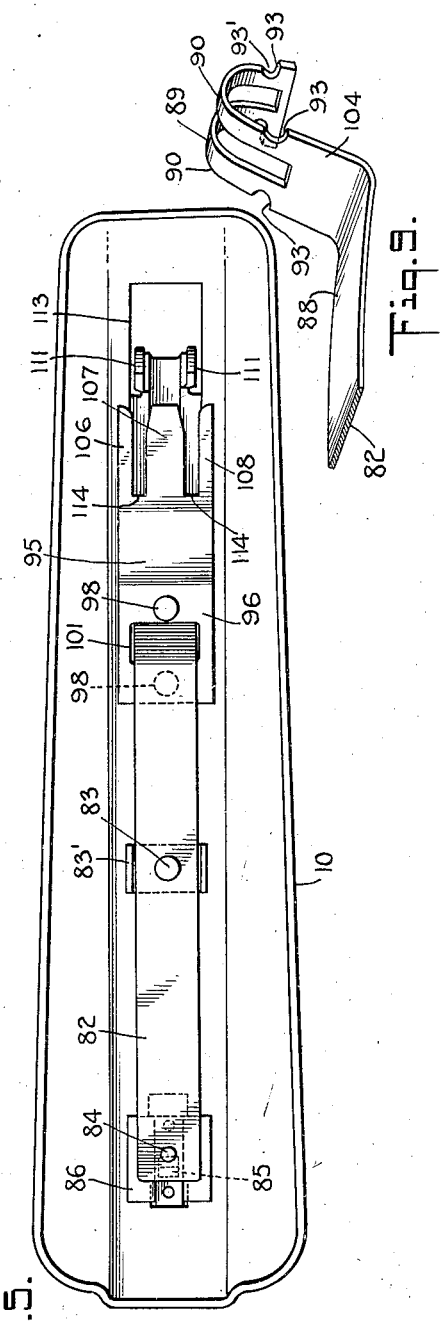
INVENTOR
LOUIS VON CSEH
BY
*Cm Palmer*
ATTORNEY March 7, 1950 L. VON CSEH 2,499,432
STAPLING MACHINE
Filed Aug. 27, 1945 4 Sheets-Sheet 3
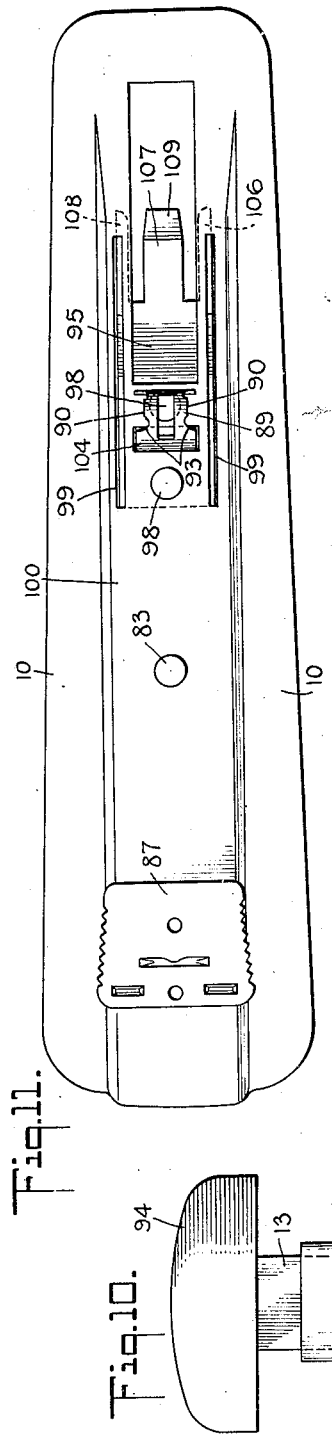
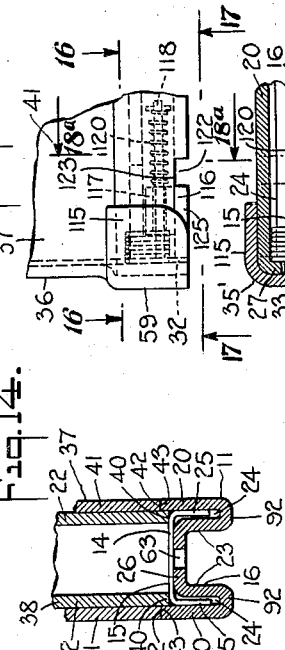
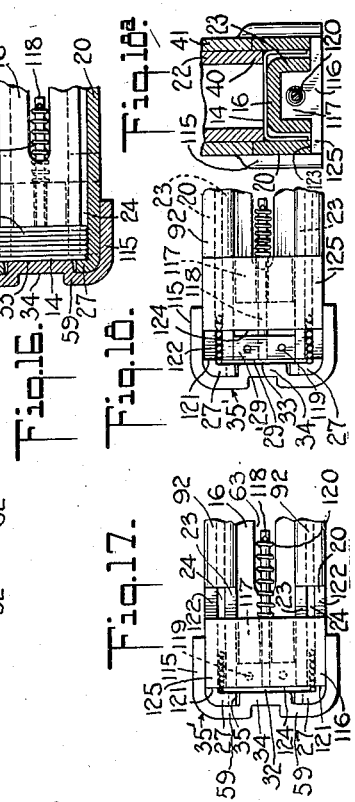
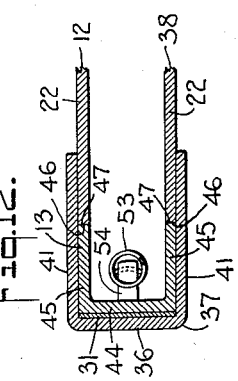
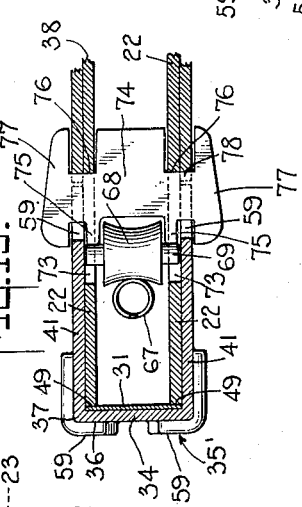
INVENTOR
LOUIS VON CSEH
BY
*Cm Palmer*
ATTORNEY

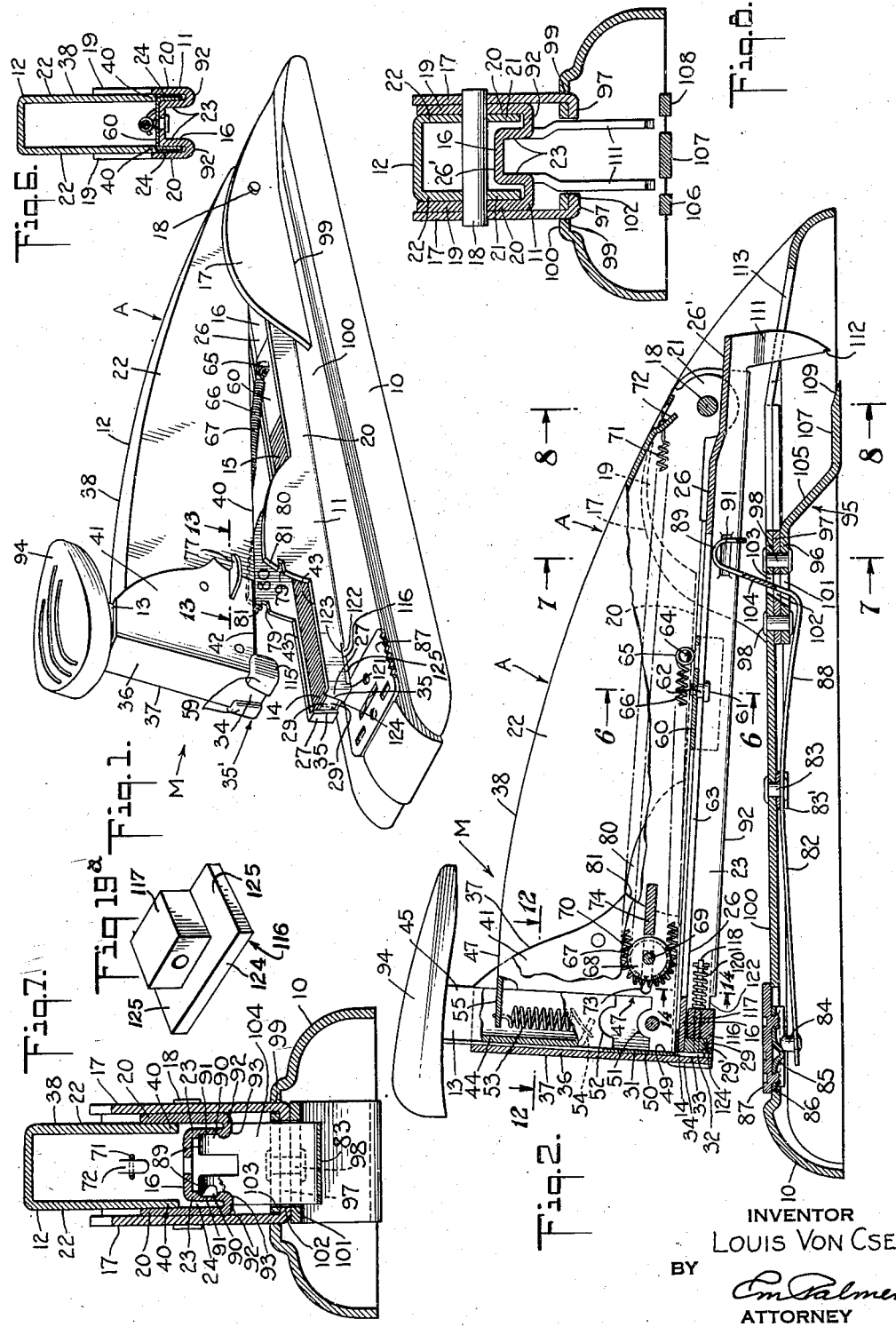

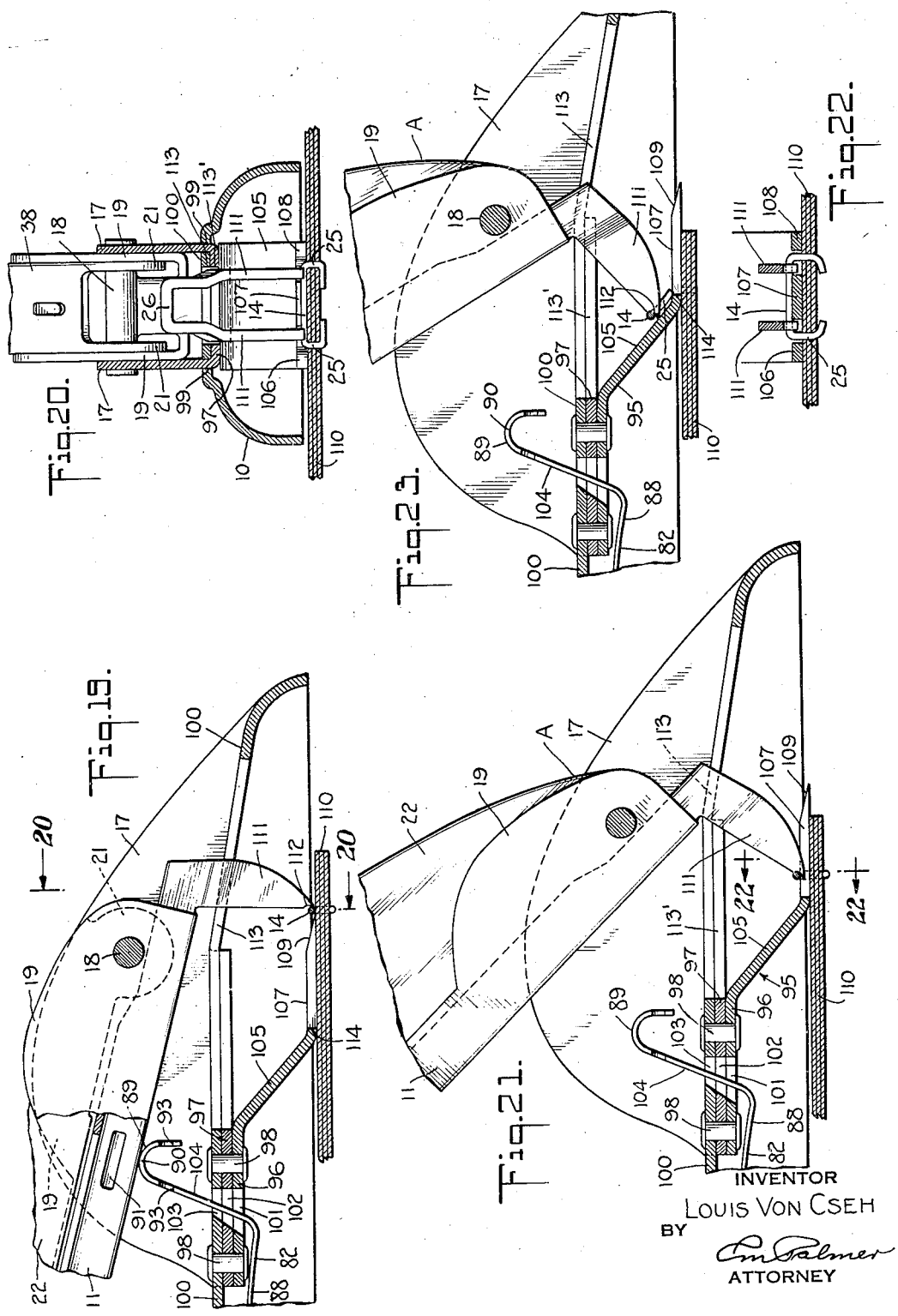

Patented Mar. 7, 1950

2,499,432

UNITED STATES PATENT OFFICE 2,499,432

STAPLING MACHINE

Louis von Cseh, New York, N. Y., assignor to Speed Products Company, Inc., Long Island City, N. Y., a corporation of New York Application August 27, 1945, Serial No. 612,754

16 Claims. (Cl. 1—3)

The invention relates to stapling devices and the objects, advantages and functional and structural features thereof will be more readily understood and appreciated from the following detailed specification considered in the light of the accompanying drawings wherein:

Fig. 1 is a perspective view of the stapling machine according to my invention, illustrating the cover partly opened or pivotally raised from the magazine.

Fig. 2 is a side elevational view of Fig. 1, partly broken away and in section to illustrate the internal construction.

Fig. 3 is a plan view of the magazine.

Fig. 4 is a longitudinal and vertical sectional view on the line 4—4 of Fig. 3.

Fig. 5 is an underneath view of the base.

Figs. 6, 7 and 8 are transverse sectional views on the lines 6—6, 7—7 and 8—8 of Fig. 2.

Fig. 9 is a fragmentary perspective view of the clearing spring.

Fig. 10 is a front elevational view of Fig. 1 illustrating the cover closing the magazine.

Fig. 11 is a plan view of the base.

Fig. 12 is a transverse sectional view on the line 12—12 of Fig. 2.

Fig. 13 is a horizontal sectional view on the line 13—13 of Fig. 1.

Fig. 14 is a sectional view on the line 14—14 of Fig. 2.

Fig. 15 is a fragmentary side view of the stapling machine.

Fig. 16 is a view taken on the line 16—16 of Fig. 15.

Fig. 17 is a bottom view taken on the line 17—17 of Fig. 15.

Fig. 18 is a view similar to Fig. 17 but showing the slidably guided and spring controlled race block opened.

Fig. 18a is a sectional view on the line 18a—18a of Fig. 15.

Fig. 19 is an enlarged and fragmentary view of the Fig. 2 showing the staple removing means of the swingable arms about to engage a clinched staple just prior to its extraction.

Fig. 19a is a perspective view of the compensatory spring controlled block.

Fig. 20 is a transverse sectional view on the line 20—20 of Fig. 19.

Fig. 21 is a view similar to Fig. 19 showing the staple removing means engaging and moving the bridge of the clinched staple and about ready to completely extract it.

Fig. 22 is a transverse sectional view on the line 22—22 of Fig. 21 and

Fig. 23 is a view similar to Fig. 12 exhibiting the staple extracted from the material formerly anchored by it.

The stapling machine according to the invention is concerned with providing a readily accessible raceway or staple guide to permit convenient removal of clogged staples without sacrificing staple balance or staple support as the staple is driven through the raceway. Where such staple support is lessened it is a well known fact that the efficiency of the stapling machine is reduced. By such loss of efficiency, the problem of effectively penetrating the legs of the staple into the material to be clinched by the staple is encountered and this is particularly evident in attempting to adequately clinch or anchor a large stack of sheet material. The present invention comprehends as an aspect thereof the utilization of stabilizing means effective to maintain continuous staple support for the driven staple as it passes downwardly through the raceway in a stapling machine where direct access may be had to the staple raceway for clearing the latter of clogging staples or parts thereof or of undesirable but inevitable accumulation of adhesive formerly uniting the staple strip. Specifically the invention deals with an improved stapling machine wherein a movable cover serves as closure means for a simplified magazine wherein direct access may be had to the staple raceway upon opening of the cover which action withdraws the staple stabilizing means from the magazine and wherein the stabilizing means forms a part of the raceway when the cover is closed at which time the stabilizing means substantially completes the raceway and the cover precludes access to the staple guiding means in the magazine.

Another important aspect of the invention is realized in the provision of a novel and serviceable stapling machine wherein a clinched staple may be readily removed or extracted upon displacement of the staple carrying magazine relative to the base. As a further advantage of the invention, a slidable and spring controlled race block is utilized to provide a part of the staple raceway and to characterize means adapted to be shifted in a direction away from the major part of the raceway and thus provide access to the latter for readily clearing clogged staples or parts thereof.

Referring to the drawings, the stapling machine generally designated M comprises a base 10, a staple magazine 11, a cover broadly indicated 12 and staple driving means 13 for ejecting a staple 14 of a staple strip 15 mounted on the rail 16 of the magazine. More particularly the base 10 includes upstanding and spaced ears 17 sustaining fulcrum pin 18 on which the spaced ears 19 extending upwardly from the spaced sides 20 of the magazine 11 are pivotally sustained. Ears 21 depending from the spaced sides 22 of the cover 12 are also pivotally mounted on the fulcrum pin 18.

The magazine 11 is a one piece member having its spaced sides 20 integral with but spaced from the spaced sides 23 of the rail 16 to define the spaced and longitudinally arranged channels 24 (Fig. 14) for slidably guiding depending legs 25 of the inverted U-shaped staples 14 of the staple strip 15. Specifically the top wall 26 of the rail 16 and its depending sides 23 together with the spaced and outer sides 20 characterize means for guiding the staple strip 15 longitudinally of the magazine.

Integral with the spaced sides 20 of the magazine at the forward end thereof are the inwardly bent lips 27 defining a vertically arranged gap or throat 28 coextensive with the height of the sides 20. These spaced lips 27 are parallel to and spaced from the front vertical face 29' of the race block 29 and define spaced grooves 30 for guiding the spaced legs 25 of a foremost staple as it is driven downwardly by the blade 31 of the slidable staple driver 13 through the staple guideway or raceway generally denoted 32 defined by the front wall 29' of the race block 29, the walls of the alined grooves 30, and the inside face 33 of the tapered closure 34 or boss for gap or throat 28 defined by the lips 27. This closure fits closely and removably between the spaced and inclined faces 35 of the lips 27 and is a part of a substantially U-shaped stabilizing means in the form of a depending apron broadly denoted 35' which integrally extends downwardly from and is offset with respect to the U-shaped sheath 37 appropriately straddling and desirably fixed to the spaced sides 22 of the case 38, the latter together with the sheath 37 constituting the swingable cover 12 for the magazine 11 while the latter together with the cover may be considered as a swingably connected arm generally indicated A.

The inwardly extending boss 34 of the stabilizing means in fact is a part of the raceway 32 and serves to support a staple as it is driven through and out of the raceway. The lower margins 40 (Fig. 14) of spaced sides 22 of the case 38 extend below the spaced sides 41 of the sheath 37 and are removably received by the spaced sides 20 of the rail 16. These margins 40 are approximately coextensive with the length of the magazine and are removably straddled by the sides of the latter and serve to position the cover relative to the magazine and to prevent upward displacement of the staples when the cover is closed.

The lower faces 42 of the spaced sides 41 of the sheath 37 are removably seated on the spaced upper faces 43 (Fig. 14) of the sides 20 of the magazine 11 at which time margins 40 are telescopically associated with the magazine and the depending tapered boss 34 of the stabilizing apron 35' is in alinement with and straddled by the tapered lips 27, thus closing the gap or throat 28.

The driver 13 is a U-shaped member having its front wall 44 fixedly carrying the staple driving blade 31 and having its spaced side walls 45 slidably guided by and between the spaced sides 41 of the sheath 37. The rear faces 46 (Fig. 12) of the sides 45 of the driver 13 are also slidably guided by the spaced transverse faces 47 of the spaced sides 22 of the case 38. The forward portions 49 (Fig. 2) of the spaced sides 22 of the case 38 are reduced and are spaced from the front wall 36 of the sheath 37 and define gap 50 for also closely and movably guiding the driving blade 31 and arcuate lugs 51 projecting upwardly from portions 49 act as stop means for the slidable plunger 13 and are received by the notched portion 52 in the spaced sides of the driver or plunger 13 to limit downward displacement of the latter at which time blade 31 has driven the foremost staple of the staple strip out of the guideway 32. The staple driver is automatically held in an elevated position by the normally contracted helicoidal spring 53 attached to the lug 54 extending from the movably guided driver 13 and a lug 55 projecting from the top wall of the case 38.

Slidably mounted on the rail 16 is an inverted U-shaped follower block 60 having secured thereto rivet 61 provided with a reduced portion 62 which is slidably guided in the elongated rectilinear slot 63 in the top wall 26 of the rail. Anchored to a hook or lug 64 projecting upwardly from the follower block 60 is a coil 65 of the lower reach 66 of the helicoidal spring 67 looped over roller 68 rotatably mounted on the pin or shaft 69 slidably guided in the spaced sides 22 of the case 38. The upper reach 70 of spring 67 has its rear end 71 desirably anchored to lug 72 depending from the top wall of the case 38. Specifically the ends of shaft 69 are slidably guided in the spaced and alined slots 73 in the spaced sides 22 of the case 38. The latch 74 is also slidably guided in the alined slots 73 and in the alined slots 59 in the spaced sides 41 of the sheath 37.

Spaced lugs 75 of latch 74 slidably drive the roller shaft 69 against the resistance of spring 67 and the latter normally holds the latch retracted against alined rear walls 76 of alined slots 73 in the side walls 22 of the case 38 when the cover is opened. Wings 77 of the latch 74 may be grasped and shifted forwardly against the resistance of the looped spring 67 to remove it from the alined notches 79 of the upstanding wings 80 of the magazine sides 20. This action shifts the latch forwardly and consequently roller 68 is shifted forwardly. The cover 12 may now be said to be unlocked from the magazine and may be swung rearwardly for complete access to the rail 16. When the cover is closed, the spaced portions 78 of the latch ride along the arcuate cam faces 81 and ultimately snap into the alined notches 79 by the action of the loop spring 67.

Within the base and secured thereto is the elongated leaf spring 82 disposed in the channeled member 83' and fastened at its intermediate portion by the rivet 83. The forward end of spring 82 is provided with a fixed projection 84 cooperating with rib 85 of a slidably guided channeled plate 86 attached to a slidable anvil 87 for holding the latter in a retracted or projected position for permanent or temporary clinching of a driven staple. The rear end 88 of the spring 82 extends downwardly, then upwardly terminating in the spaced arched portions 89 having inverted U-shaped lips 90 adapted to snap into and disengageably interlock with recesses or keepers 91 in the spaced sides 23 of the rail 16. The lower U-shaped portions 92 which integrally unite the sides 23 of the rail with the outer sides 20 of the magazine are adapted to be seated on the alined and spaced shoulders 93 (Fig. 9) defined by alined notches 93' of the arched portion 89. Thus when the cap 94 of driver 13 is depressed at a time when lips 90 are interlocked with the magazine, and specifically with the wall keepers 91, the bends or U-shaped portions 92 abut the spaced shoulders 93 and consequently the arched portions 89 will be depressed, deflecting the rear end 88 of the leaf spring downwardly. Upon removal of manual pressure on the cap 94, arm A of the stapling machine defined by the magazine and the cover is automatically pivotally raised by the retractive action of spring portion 88. By this arrangement the magazine is normally pivotally held spaced from the base.

Also attached to the base is the fork broadly denoted 95 having an upper forwardly projecting extension 96 disposed against the bridge 97 integrally connecting the ears 17. More particularly rivets 98 fasten together the extension 96, the bridge 97 and the top wall 100 of the base. Slots 99 in the top wall 100 of the base permit the ears 17 to be threaded therethrough until the bridge 97 abuts the underface of the top wall 100 after which the extension 96 of the fork 95 is applied to the bridge 97 and the rivets 98 secure these parts together. Ears 17 together with their common bridge define a U-shaped member or yoke adapted to be conveniently assembled with and secured to the base.

Extension 96 is provided with the opening 101 in alinement with gap 102 of the bridge 97 which in turn is in alinement with the opening 103 in the top wall 100 of the base. Through these openings and gap, freely extends the inclined reach 104 of the clearing spring 82, thus permitting the latter to be readily displaced when actuated by the magazine or when released for automatically elevating the magazine.

The fork 95 has the downwardly and rearwardly extending inclined portion 105 which merges with the three horizontally disposed and spaced prongs or tongues 106, 107 and 108, the middle tongue 107 being provided with the tapered terminal 109 adapted to be straddled by the legs 25 of a clinched staple 14 and adapted to be readily inserted under the bridge of the clinched staple preparatory to extracting or withdrawing thereof from material 110 which it secures.

The rear portion 26' of the rail is reduced and is offset slightly thereto and depending from and integral with the spaced sides of the reduced portion 26' are the spaced staple lifting claws 111 each of which has a notch 112 adjacent its pointed end or staple-engaging terminal.

When the clearing spring 82 is free of the keepers 91 of the magazine, the arm A may be swung upwardly and rearwardly, pivoting on the fulcrum hinge pin 18. By such action the spaced claws 111 swing downwardly and forwardly in that they are bodily carried by the magazine and as previously stated integral therewith.

If it be assumed that staple 14 (Figs. 19 and 20) is clinched to the material 110 and it is desired to extract it, the stapling machine is grasped and the rear end thereof is moved towards the bridge of the clinched staple. Even though the magazine is closed by the cover and interlocked with the clearing spring, the operator may observe through the opening 113 in the top wall 100 the movement of the tongue 107 as its terminal 109 is positioned under the bridge of the clinched staple preparatory to its extraction. Thereafter the operator grasps the arm A and swings it rearwardly. This action not only unlocks the clearing spring 82 from the magazine, but in addition the notches 112 of the depending claws 111 receive the bridge of the staple drawing the latter relatively along the tongue 107 (Fig. 21) ultimately against shoulders 114 and subsequently upwardly, thus causing the legs 25 of the staples to straighten out and be withdrawn from the material 110 (Fig. 23). As the claws 111 draw the bridge of the staple over tongue 107, the latter is progressively projected between the legs 25 of the staple, or in other words, the base of the machine is advanced rectilinearly relative to the staple until the bridge of the staple strikes the shoulders 114 after which the notches and pointed terminals lift or extract the staple completely from the material 110 (Fig. 23).

The jaws or claws 111 project into the opening 113 in the top wall 100 of the base and through an opening or gap 113' in the bridge 97 of the yoke. Thus the jaws 111 have ample freedom in their swingable displacement.

Referring again to the stabilizing means in the form of the apron 35', the latter depends from the front wall 36 and the spaced side walls 41 of the sheath 37 and in fact embodies front and spaced cheeks 59 offset relative to closure 34 (Fig. 17) and closely and removably disposed contiguous to and outside of the spaced lips 27 to preclude outward spreading of the latter while the side wings 115 removably and closely embrace or straddle the front ends of the sides 20 of the magazine. Therefore these sides 20 are also prevented from spreading outwardly in the event of clogging of staples in the staple raceway or guideway 32 and thus their required distance from the sides 23 of the rail is always maintained. Moreover the inside face 33 of the base or rib 34 is slightly longer than the height of the staple raceway 32 and forms a part thereof as previously pointed out to support the foremost staple as it is driven out by the blade 31 of the reciprocable and self-retracting driving means 13.

Should clogging of staples take place in the staple raceway 32 the latter may be quickly cleared of such obstruction by sliding the spring controlled compensatory means in a direction away from the lips 27, the compensatory means being in the form of a rectangular shaped plate or block 116 (Fig. 18ª) having a reduced portion 117 slidably guided by and between the spaced sides 23 of the rail 16. The reduced portion 117 is also slidably mounted on the fixed pin 118 appropriately fastened to or forced into the fixed race block 29 interposed between the front ends of the sides 23 of the rail (Fig. 18). The race block 29 is fixedly anchored by pins 119 to the upper wall 26 of the rail. The spring 120 has one end anchored to the pin 118 and while surrounding the latter also yieldingly abuts the rear end of the reduced portion 117, thus normally holding the block 116 yieldingly against the front shoulders 121 of the spaced cutaway portions 122 at the lower front part of the magazine. By this arrangement the front vertical face 124 of the block 116 is normally in alinement (Fig. 2) with the front face 29' of the fixed race block 29 and thus face 124 also supports the staple as it is driven through the raceway 32.

The guided block 116 has marginal portions 125 (Fig. 18ª) slidably arranged against the faces 123 of the cutaway portions or recesses 122 formed on the underside of the magazine and when the cover closes the magazine wings 115 of the stabilizing apron 35' also closely and removably straddle the marginal portions 125 of the slidable block 116.

Where the cover is closed, the slidably guided block 116 is at the lower part of the raceway and forms a part thereof. Should this raceway become clogged, block 116 may be quickly shifted away from the shoulders 121. Accordingly greater access may be had to the clogged portions which now may be quickly removed and of course access may be had to the raceway 32 by unlocking the cover and swinging it rearwardly thus removing the apron 35' from the front part of the magazine.

By the arrangement disclosed the staple as it is driven through the raceway is at all times fully supported, hence preventing tilting thereof, thus resulting in greater efficiency in the matter of effecting thorough penetration of the driven staple through a relatively thick stack of sheet material.

Various changes may be made in the construction and arrangement of parts without departing from the spirit of the invention or sacrificing any of the advantages thereof inherent therein.

I claim:

1. In a stapling machine, a magazine including means for slidably guiding staples and having at one end thereof inwardly turned and spaced lips defining a throat, and a cover for closing said magazine and having depending stabilizing means closely straddling said magazine at said end and having closure means disposed in said throat.

2. In a stapling machine, a magazine including means for slidably guiding staples and including at one end thereof inwardly turned and spaced lips defining a throat, a cover for closing said magazine and having depending stabilizing means closely straddling said magazine at said end and having closure means removably disposed in said throat, and means for movably sustaining said cover relative to said magazine.

3. In a stapling machine, a magazine including means for slidably guiding staples and including at one end thereof inwardly turned and spaced lips defining a throat, and a cover for closing said magazine and having a depending apron including channeled means closely and removably disposed in said throat.

4. In a stapling machine, a magazine including means for slidably guiding staples and including at one end thereof inwardly turned and spaced lips defining a throat, and a cover for closing said magazine and having a depending apron having spaced wings closely and removably straddling said magazine at said end and having boss means removably disposed in said throat, and means swingably sustaining said cover relative to said magazine.

5. In a stapling machine, a rail for supporting staples and having spaced depending sides, a magazine integral with said rail and having upstanding sides spaced from and straddling said rail and including inwardly turned lips spaced from the front end of said rail and defining a throat, a block fastened to said rail at said forward end, and a cover for closing said magazine and having depending stabilizing means for removably embracing said upstanding sides and having boss means receivable in said throat.

6. In a stapling machine, an inverted U-shaped rail for supporting staples and having spaced depending sides, a magazine having upstanding sides spaced from and straddling said rail and including inwardly turned lips spaced from the front end of said rail and defining a throat, a race block interposed between said depending sides and spaced from said lips to define a staple raceway, and a cover for closing said magazine and having depending stabilizing means for removably embracing said upstanding sides and having transversely arranged means receivable in said throat to form a part of said raceway.

7. In a stapling machine, a hollow rail for supporting staples and having spaced depending sides, a magazine integral with said rail and having upstanding sides spaced from and straddling said rail and including inwardly turned lips spaced from the front end of said rail and defining a throat, a race block interposed between sides of said front end and spaced from said lips, a cover for closing said magazine and having depending stabilizing means for removably embracing said upstanding sides and having means receivable in said throat, compensatory means having means slidably guided by said rail, means sustaining said compensatory means, stop means for arresting said compensatory means in alinement with said race block, and yieldable means normally urging said compensatory means against said stop means.

8. In a stapling machine, a staple supporting magazine having spaced lips defining a throat, and a cover for said magazine embodying a depending skirt removably embracing said magazine and having offset closure means removably receivable in and complementary to said throat.

9. The stapling machine according to claim 8 wherein a floating and yieldably sustained compensator is normally spaced from said lips and defines therewith and said offset closure means a staple raceway.

10. The stapling machine according to claim 9 characterized further in that a race block is carried by said magazine and slidably guides said compensator.

11. In combination, a magazine having means embodying a staple raceway and comprising a bottom wall and spaced upstanding sides integral therewith and embodying transversely disposed and spaced lips forming a part of said raceway and defining a throat, a cover for said magazine and having an apron depending from a lower part thereof and comprising spaced wings removably and closely straddling said sides and comprising spaced transversely disposed cheeks removably arranged contiguous to and outside of said lips to reinforce the latter and including means integral with and offset relative to said cheeks and removably projectible into said throat to aline with said lips to constitute a part of said raceway, and means movably guiding said cover relative to said magazine to provide for displacement of said apron and cover toward or away from said magazine.

12. In combination, a magazine having means embodying a staple raceway and comprising a bottom wall and spaced upstanding sides integral therewith and embodying transversely disposed and spaced lips forming a part of said raceway and defining a throat, a cover for opening and closing said magazine and having an apron depending from the lower front part thereof and comprising spaced wings removably and closely straddling said sides and comprising spaced transversely disposed cheeks removably arranged contiguous to and outside of said lips to reinforce the latter and including intervening means integral with and offset relative to said cheeks and removably projectible into said throat to close the latter and aline with said lips to constitute a part of said raceway, and means mov- 13. In combination, a magazine having means embodying a staple raceway and comprising a bottom wall and spaced upstanding sides integral therewith and embodying transversely disposed and spaced lips forming a part of said raceway and defining a throat, a cover for opening and closing of said magazine and having an offset substantially U-shaped apron depending from the front lower part thereof and comprising spaced wings removably and closely straddling and stabilizing said sides against outward spreading and comprising spaced transversely disposed cheeks removably arranged contiguous to and outside of said lips to reinforce the latter and including means integral with and offset relative to said cheeks and removably projectible into said throat to aline with said lips to constitute a part of said raceway, and means movably guiding said cover relative to said magazine.

14. In combination, a magazine having means embodying a staple raceway and comprising a bottom wall and spaced upstanding sides integral therewith and embodying transversely disposed and spaced lips forming a part of said raceway and defining a downwardly converging tapered throat, a cover for opening and closing said magazine and having an apron depending from the lower part thereof and comprising spaced wings removably and closely straddling said sides and comprising spaced transversely disposed cheeks removably arranged contiguous to and outside of said lips to reinforce the latter and including downwardly converging tapered means integral with and offset relative to said cheeks and removably projectible into said throat to close the latter and aline with said lips to constitute a part of said raceway, and means movably guiding said cover relative to said magazine.

15. In combination, a magazine having means embodying a staple raceway and comprising a bottom wall and spaced upstanding sides integral therewith and embodying transversely disposed and spaced lips forming a part of said raceway and defining a downwardly converging tapered throat coextensive the height of said lips, a cover for opening and closing said magazine having an offset substantially U-shaped apron depending from the front lower part thereof and comprising spaced wings removably and closely straddling said sides and comprising spaced transversely disposed cheeks removably arranged contiguous to and outside of said lips to reinforce the latter and including downwardly converging and tapered means integral with and offset inwardly relative to said cheeks and removably projectible into said throat to close the latter and aline with said lips to constitute a part of said raceway, and means movably guiding said cover relative to said magazine.

16. In combination, a magazine having means embodying a staple raceway and comprising a bottom wall and spaced upstanding sides integral therewith and embodying transversely disposed and spaced lips forming a part of said raceway and defining a throat, a cover for said magazine having an offset substantially U-shaped apron integral with and depending from the lower part thereof and comprising spaced wings extending below the lower margin of said cover and removably and closely straddling said sides and comprising spaced transversely disposed means arranged below said lower margin and removably arranged contiguous to and outside of said lips to reinforce the latter and including means integral and interconnecting with and offset relative to said cheeks and removably projectible into said throat to close the latter and aline with said lips to constitute a part of said raceway, and means movably guiding said cover relative to said magazine.

LOUIS von CSEH.

REFERENCES CITED

The following references are of record in the file of this patent:

UNITED STATES PATENTS

| Number | Name | Date |
|---|---|---|
| 1,845,186 | Raeburn | Feb. 16, 1932 |
| 2,033,050 | Pankonin | Mar. 3, 1936 |
| 2,102,087 | Pankonin | Dec. 14, 1937 |
| 2,150,127 | Passek | Mar. 7, 1939 |
| 2,251,915 | Crosby | Aug. 12, 1941 |
| 2,268,102 | Attula | Dec. 30, 1941 |
| 2,309,779 | Maynard | Feb. 9, 1943 |